R. J. OWENS.
GRAIN SEPARATOR.
APPLICATION FILED DEC. 7, 1908. RENEWED SEPT. 19, 1912.
1,095,592.
Patented May 5, 1914.
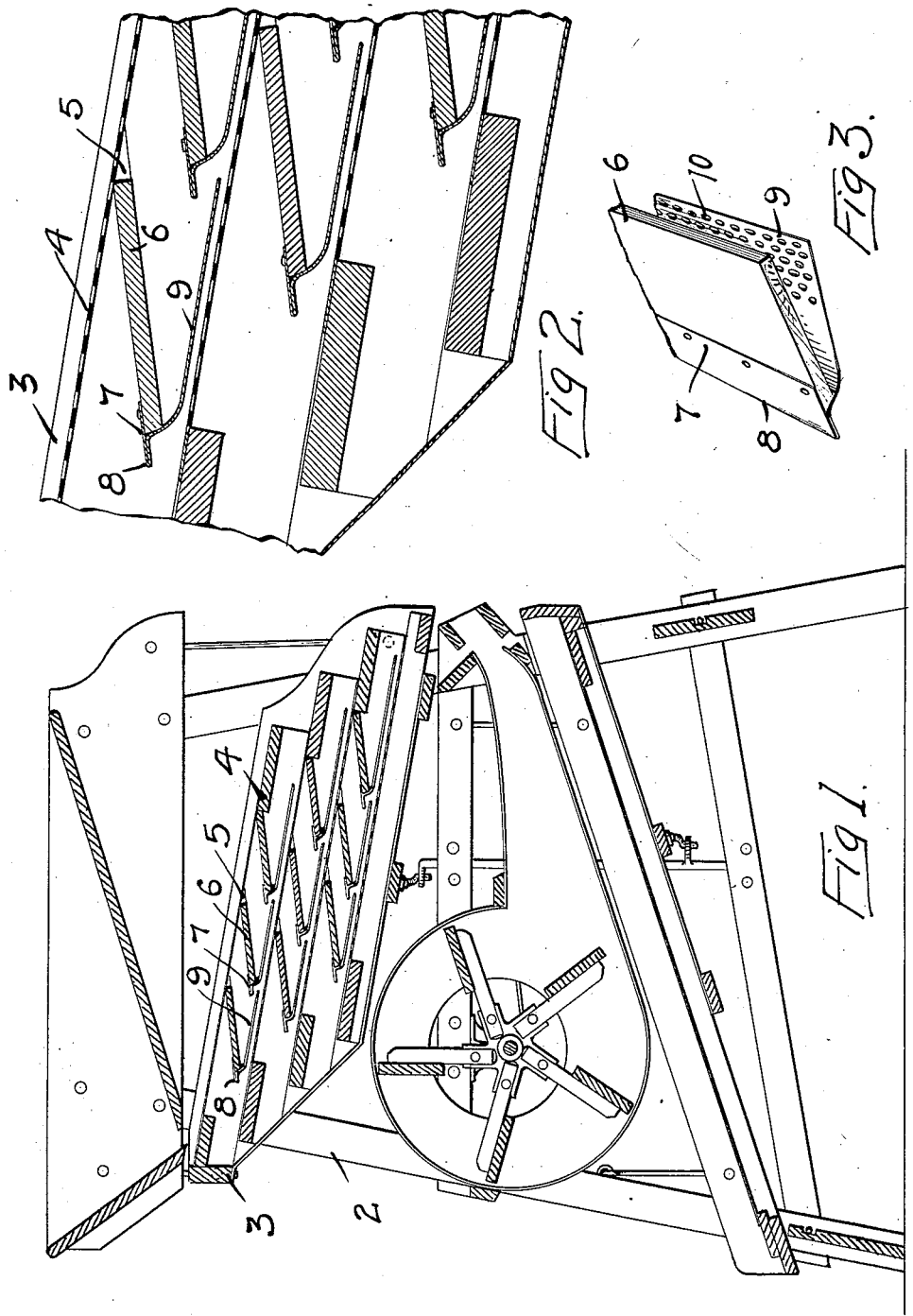
WITNESSES
INVENTOR
ROBERT J. OWENS
BY Paul & Paul
HIS ATTORNEYS

UNITED STATES PATENT OFFICE.

ROBERT J. OWENS, OF MINNEAPOLIS, MINNESOTA.

GRAIN-SEPARATOR.

1,095,592.          Specification of Letters Patent.          Patented May 5, 1914.

Application filed December 7, 1908, Serial No. 466,283. Renewed September 19, 1912. Serial No. 721,323.

*To all whom it may concern:*

Be it known that I, ROBERT J. OWENS, of Minneapolis, Hennepin county, Minnesota, have invented certain new and useful Improvements in Grain-Separators, of which the following is a specification.

The object of my invention is to provide a machine for separating one kind of grain from another, advantage being taken of the difference in length of the kernels of grain to be separated and the sieves having means to prevent the longer grains or seeds, such as oats, from assuming an oblique or perpendicular position while passing over the sieves, thereby compelling them to move flatwise, while the shorter and smaller kernels, such as wheat, are permitted to pass down through the sieves.

A further object is to provide means for increasing the capacity of the machine and rendering it more efficient as a grain separator.

The invention consists generally in various constructions and combinations, all as hereinafter described and particularly pointed out in the claims.

In the accompanying drawings, forming part of this specification, Figure 1 is a vertical, sectional view, Fig. 2 is an enlarged detail view of one end of the sieve, Fig. 3 is a detail view, showing the construction of my improved separating device.

In the drawing, 2 represents a fanning mill of the usual type having an oscillating sieve shoe 3, wherein a series of sieves 4 are arranged in the usual way. The side walls of the sieve shoe have diagonally arranged grooves 5 therein, forming guide-ways for plates 6, which extend from side to side across the shoe between the sieves. The lower edges of the plates 6 are located near the surfaces of the sieves and on these lower edges I secure plates 7 of metal or other suitable material having lips 8, which project beyond the lower edges of the plates 6 and in substantially the same plane. The material composing these lips is bent backwardly under the lower ends of the plates and extends in a plane parallel substantially with the sieves and near the surface thereof and forming riders 9, the lower ends of which extend beneath the lips of the contiguous plate in the shoe, so that the material falling on each plate, except the upper one of each series will be discharged from this lip upon the rider of the plate next above. This will be apparent from an inspection of Fig. 2, where the relative arrangement of the plates, lips and riders is clearly shown. In this view, assuming that grain falls from the upper sieve upon the first plate 6 of the upper series, it will, through the motion of the sieve shoe, slide down over the lip 8 and be discharged upon the upper portion of the second sieve. The grain falling on next to the upper plate of the first series will be directed by its lip upon the rider beneath and the oats, striking this rider, will assume a perpendicular position and pass off the rider upon the sieve without changing their position and the riders being close to the surface of the sieves, will prevent the oats from tipping up to a perpendicular position in passing beneath them. Those that do tip up sufficiently to drop through the sieve, will fall upon the plate and rider beneath and be again directed to a horizontal or flatwise position. This control of the longer grain will be maintained until it is discharged at the tail end of the sieves. The wheat and shorter grain will fall through the perforations in the sieves and be directed finally in the lower portion of the shoe through the air blast in the usual way. The use of the riders 9, which may be flexible or not, as preferred, and made of any suitable material, greatly increases the working surface and the capacity of the machine, all of which is very essential in an apparatus of this type. As indicated in the drawings, the riders are provided with a series of perforations 10. These however, may be omitted, if preferred. I prefer to make the riders, of comparatively thin sheet metal, which, contacting with the oat kernels, will continue to hold them flatwise on the sieves. The riders of this material would obviously be flexible, but I do not regard this as a necessity to the successful operation of the machine, as some material that would be rigid and inflexible in its character, may be employed, if preferred.

This machine, although of the ordinary size and shape, will, through the improvements which I have described, have a much greater efficiency and capacity than would be possible in machines of this type, as usually constructed.

I claim as my invention:

1. In a grain separator, the combination, with a shoe, of a series of inclined sieves mounted therein, a series of plates arranged in groups between the sieves and oppositely inclined with respect thereto, the lower edge of each plate in a group being near the surface of the sieve next beneath, riders carried by the lower edges of said plates and extending beneath the same in planes parallel, substantially, with said sieves and contiguous thereto, the riders of the same group of plates being in substantially the same plane and the lower edge of each plate in a group overhanging the discharge edge of the rider of the next plate beneath in the same group, and said riders being sufficiently close to said sieves to hold kernels of oats flatwise thereon.

2. In a grain separator, the combination, with a shoe, of a series of inclined sieves mounted therein, a series of plates disposed in groups between said sieves and inclined oppositely with respect thereto, the lower edges of said plates being near the surface of the sieve next beneath, said lower edges having projecting lips or extensions forming continuations thereof, riders carried by said lower edges and disposed close to the surfaces of the sieves and parallel substantially therewith, the riders of the same group of plates being in line substantially with one another, and the lips of the plates of each group overhanging the discharge edges of the riders of the adjacent plates of the same group, substantially as described.

3. In a grain separator, the combination, with a shoe, of a series of inclined sieves mounted therein, a series of plates disposed in groups between said sieves and inclined oppositely with respect thereto, the lower edges of said plates being near the surface of the sieve next beneath, riders carried by said plates and extending downwardly beneath the same in planes parallel, substantially, with said sieves and contiguous to said sieves, the lower portions of the plates in the same group overhanging the discharge edges of the contiguous riders of the same group, and the plates of the different groups being in staggered relation to one another, substantially as described.

4. In a grain separator, the combination, with a shoe, of a series of inclined sieves mounted therein, the upper ends or heads of said sieves being imperforate and in staggered relation with one another, a series of plates arranged in groups between said sieves and oppositely inclined with respect thereto, the lower edges of said plates being near said sieves and the lower edge of the upper plate of each group overhanging the imperforate head portion of the sieve beneath, riders carried by said plates in planes parallel, substantially, with said sieves and near the sieve next beneath, the space between said riders and the sieve next beneath being sufficiently narrow to prevent oat kernels from tipping up endwise therein, and the lower edges of the plates of each group overhanging the corresponding edges of the riders of the plates next above in the same group, substantially as described.

5. In a grain separator, the combination, with a shoe provided with a series of sieves mounted at an incline therein, of a series of return boards disposed between said sieves and having their upper edges in proximity to the under surfaces of the sieves above, and inclined oppositely with respect to said sieves, and riders alternately arranged and substantially covering said sieves between the lower edges of said return boards, with the lower edge of each rider projecting under the lower edge of the next succeeding return board, whereby grain falling through said sieves upon said return boards will be fed backward toward the head of said sieves and will fall upon said riders and will pass off from each rider onto the sieve under the next rider below, substantially as described.

6. In a grain separator, the combination, with a shoe provided with a series of sieves mounted at an incline therein, of a series of return boards disposed between said sieves and having their upper edges in proximity to the under surfaces of the sieves above and inclined oppositely with respect to said sieves, and flexible riders alternately arranged and substantially covering the sieves between the lower edges of said return boards, with the upper edge of each rider secured to the lower edge of the return board above, and with its lower edge projecting under the lower edge of the next succeeding return board below, whereby grain falling through said sieves upon said return boards will be fed backward toward the head of said sieves and will fall upon said riders and will pass off from each rider onto the sieve under the next rider below, substantially as described.

In witness whereof, I have hereunto set my hand this 30th day of November 1908.

ROBERT J. OWENS.

Witnesses:
RICHARD PAUL,
J. A. BYINGTON.

Copies of this patent may be obtained for five cents each, by addressing the "Commissioner of Patents, Washington, D. C."